Feb. 9, 1960

H. A. BAKKE ET AL 2,924,144

EXPOSURE METER

Filed Aug. 26, 1957

Inventors,
Hans A. Bakke,
Allen G. Stimson
by Robert F. Leche
His Attorney

Feb. 9, 1960    H. A. BAKKE ET AL    2,924,144
EXPOSURE METER
Filed Aug. 26, 1957    4 Sheets-Sheet 2

Inventors
Hans A. Bakke,
Allen G. Stimson
by Robert I. Leek
His Attorney

Feb. 9, 1960  H. A. BAKKE ET AL  2,924,144
EXPOSURE METER
Filed Aug. 26, 1957  4 Sheets-Sheet 3
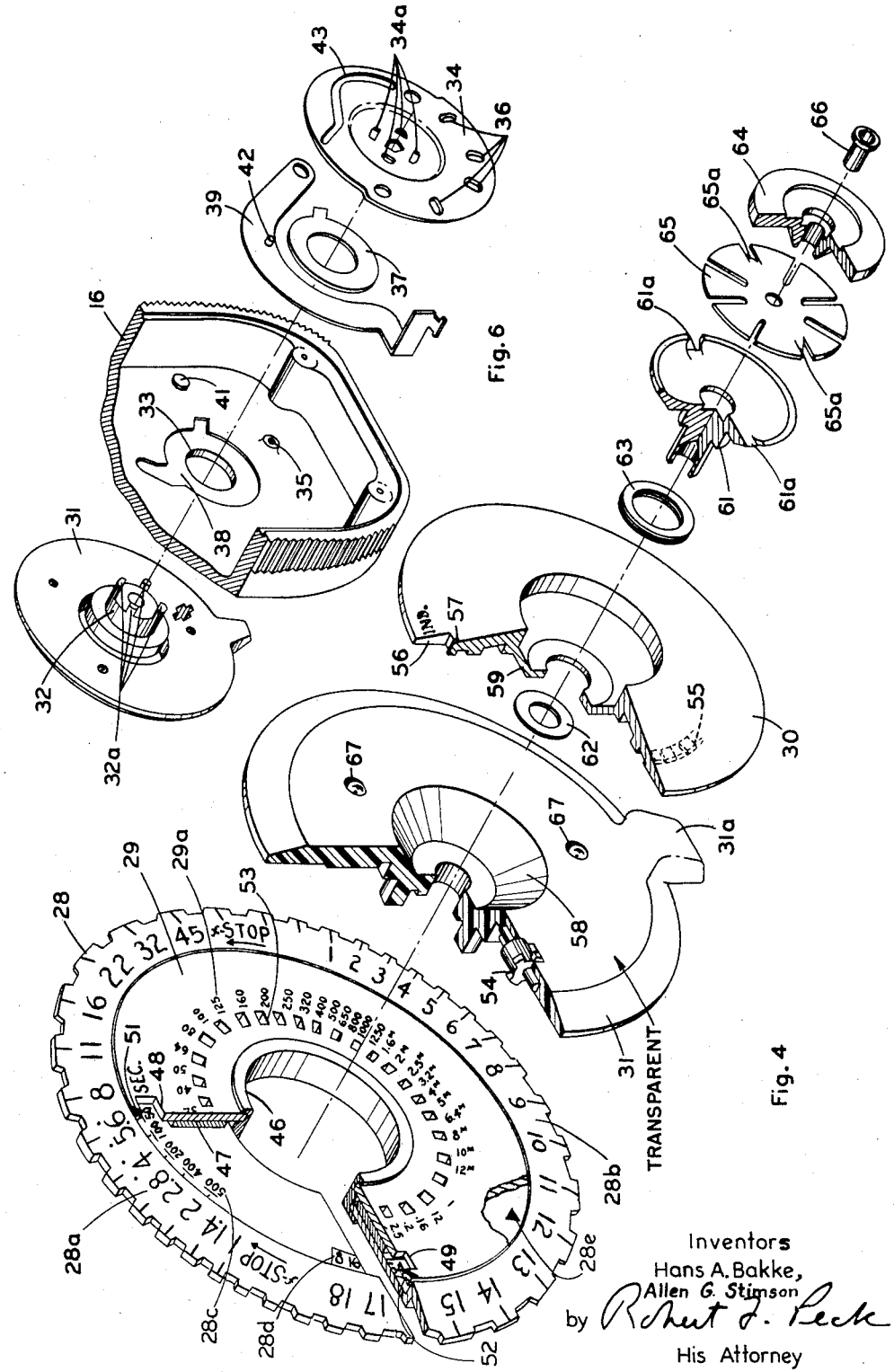
Inventors
Hans A. Bakke,
Allen G. Stimson
by Robert J. Peck
His Attorney Feb. 9, 1960  H. A. BAKKE ET AL  2,924,144
EXPOSURE METER
Filed Aug. 26, 1957  4 Sheets-Sheet 4

Inventors
Hans A. Bakke,
Allen G. Stimson
by Robert L. Peck
His Attorney

:::
United States Patent Office 2,924,144
Patented Feb. 9, 1960

2,924,144

EXPOSURE METER

Hans A. Bakke, Swampscott, Mass., and Allen G. Stimson, Rochester, N.Y., assignors to General Electric Company, a corporation of New York Application August 26, 1957, Serial No. 680,099

12 Claims. (Cl. 88—23)

This invention relates generally to improvements in exposure meters and more particularly to an improved scale arrangement therefor, from which may be derived a compact, highly versatile direct reading device.

In the art of photography, continued improvements and refinements in cameras and photographic film have resulted in a wide variety of commercially available cameras and films which now encompass wide ranges in exposure data. In devising an all-purpose exposure meter capable of accurately measuring within these wide ranges, which at the same time possesses the high degree of versatility required for use with a wide variety of both still and motion picture cameras, the scales on which the exposure data is presented pose a number of serious problems to designers of such equipment. For example, maximum exposure data must be presented by the scales for all-purpose use, but overcrowding of the scales must be avoided to insure good readability when the exposure meter is used; the markings on the scales must be clear, distinct, and of sufficient size to facilitate good readability; the scales should be arranged relative to each other to permit quick and direct setting of the appropriate exposure data; the scales should form a compact component of the exposure meter to insure that the overall device does not become overly large and troublesome to handle; mounting arrangements for the scales—including any associated structure utilized in either adjusting the scales in accordance with selected exposure data or accommodating the scales for a range in exposure meter sensitivity —should be economical to manufacture, durable, as simple and compact as possible, and constructed so that manipulation of the scales and use of the exposure meter involve a minimum of effort and complexity.

The above problems, as well as others, face anyone seeking to devise an all-purpose exposure meter, and the primary object of this invention is to provide an exposure meter having a new and novel scale arrangement in which is obtained optimum resolution of the aforesaid problems.

It is another object of the invention to provide an all-purpose exposure meter that is highly versatile in its application to a wide range of exposure problems, easy to use, rugged, compact, accurate, and economical to manufacture.

In one aspect of the invention, the improved exposure meter comprises a light responsive cell connected to an electro-responsive deflecting mechanism in which a pivotally mounted pointer has a logarithmic deflection characteristic for substantially the entire range in light to which the exposure meter responds. Cooperating with the pointer is a calculator assembly which includes a plurality of concentrically arranged radially-spaced scales, one of which lies along the path of the pointer to cooperate directly therewith. A wide range in exposure data is presented by the scales, including time scales for both still and motion picture cameras, a conventional f-stop scale, and a combined exposure value and shutter number scale. Certain of the scales are arranged for relative motion in opposite directions to allow for greatly expanded scales within confined limits of space and travel, and the entire calculator assembly is mounted for angular motion as a unit to accommodate for changes in meter sensitivity. The calculator assembly is conveniently placed on the meter for maximum ease in both setting and reading the meter, and the mounting arrangements which allow for accommodation to changes in meter sensitivity not only permit such accommodation in a simple and direct manner, but also cooperates with the scale assembly to enhance the compactness and readability of the meter.

The objects of the invention, as well as its benefits and advantages, will be more fully understood upon reference to the detailed description set forth below, particularly when taken in conjunction with the drawings annexed hereto, in which:

Figure 4 is an exploded, perspective view of the calculator assembly mounted on the front cover of the device, with portions of the calculator components cut away to further illustrate the invention;

Figure 6 is an exploded, perspective view, of a portion of the arrangement shown in Figure 5, showing further the manner in which the parts cooperate to perform their function;

Figure 1:
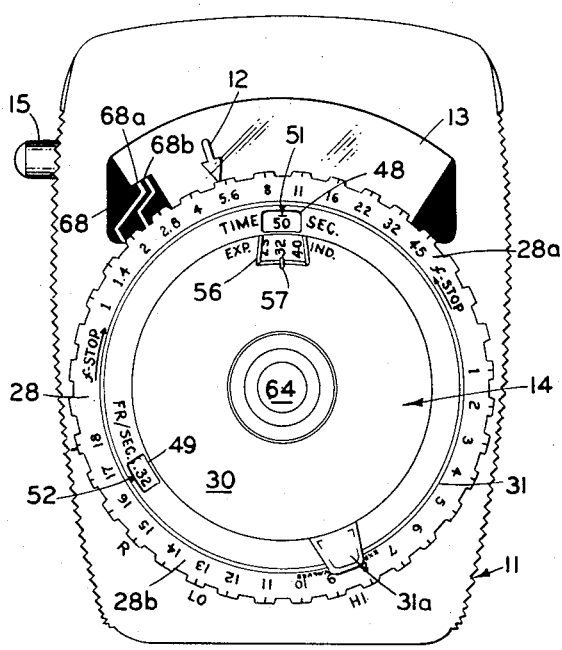
Figure 1 is a front view of the improved exposure meter.

Referring first to Figure 1, there is shown an exposure meter which embodies the subject invention, and comprising a housing 11, a pointer 12, a window 13 through which the pointer is visible, a calculator assembly 14 which cooperates with the pointer, and a push-button 15 which forms part of a conventional pointer-lock mechanism. The housing 11 may be a two-part molded plastic member, one of the parts being generally designated as a cover and shown at 16 in Figure 2, and the other part being generally designated as the base and shown at 17 in Figure 3.

Figure 2:
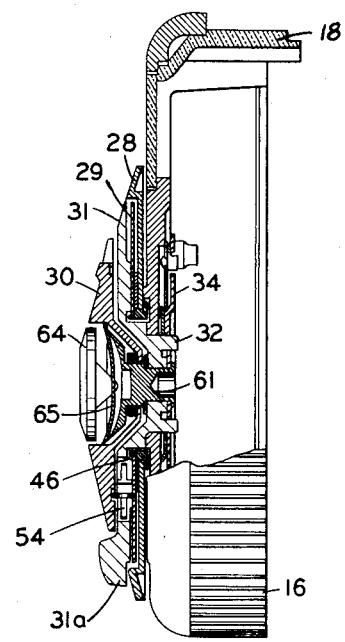
Figure 2 is a side view, in elevation, of a portion of the exposure meter shown in Figure 1, with a portion of this view being in section to further illustrate the invention.
Figure 7:
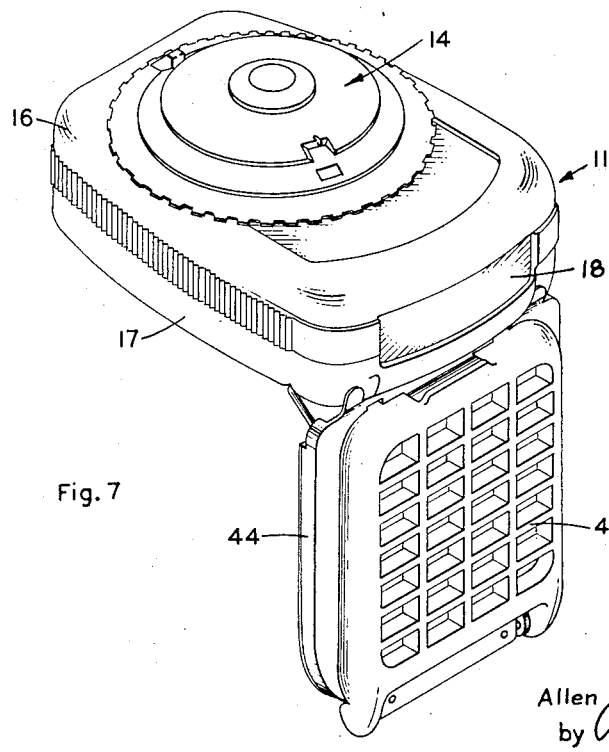
Figure 7 is a perspective view of the exposure meter of Figure 1, showing how an auxiliary light-responsive cell may be attached to increase the sensitivity of the meter; and, Figure 8 is an exploded view, similar to the arrangement shown in Figure 4, showing a slightly modified form of the invention.

As is best shown in Figures 2 and 7, cover 16 has a second window 18 formed in one end thereof, which has the effect of forming a window in one end of the exposure meter, the windows 13 and 18 being formed as a one-piece member and assembled in the exposure meter, all in the manner taught by the pending application of Hans A. Bakke, filed December 7, 1956, S.N. 626,853, and assigned along with this application to a common assignee. Of course, the windows 13 and 18 could be formed as separate pieces and assembled in the exposure meter by conventional methods, but for the reasons set forth in the aforesaid pending application, the one-piece construction is preferred. With either window construction, the cover and base fit together in a complementary manner, being held together by suitable screws to provide a substantially dust-free, moisture-free housing. For all practical purposes the present housing assembly is substantially the same as that shown in U.S. Patent No. 2,648,254—Stimson et al., also assigned to applicant's assignee, including the pointer locking push-button 15 shown in Figure 1 and its associated internal structure, further discussion of these portions of the exposure meter being unnecessary herein in view of the full description thereof in the aforesaid Stimson et al. patent.

Likewise, the arrangement of the light-responsive cell, the electro-responsive mechanism, the pointer forming a part of the deflecting mechanism, and the internal shutter which selectively covers the light-responsive cell to modify its sensitivity are—for all intents and purposes—substantially identical to the corresponding arrangements found in the aforesaid Stimson et al. patent and may be described very briefly and functionally herein, since it is the functional cooperation with the calculator assembly 14 that is important to this invention rather than the details of construction of these cooperating parts. Thus, the exposure meter includes a light-responsive cell in the form of a substantially flat elongated, rectangular photoelectric cell 19 mounted within housing 11 by means of a bracket 21, there being suitable connections therefrom to the pivotally mounted coil assembly 22. This coil assembly forms a part of an electro-responsive deflecting mechanism which includes the core member 23, the permanent magnet yoke 24 and the pointer 12. Suitable control springs bias the coil assembly in the conventional manner, with the result being that any current flow through the coil assembly causes it to pivot in the known manner, carrying with it the pointer 12. As is clearly described in the aforesaid Stimson et al. patent, such deflection has a logarithmic characteristic to match the logarithmic characteristic of light. A pivotally mounted, apertured shutter 26 is arranged adjacent to the cell 19 which by means of link 27 may be used to selectively mask the cell to modify the sensitivity of the exposure meter, all in the manner described in the aforementioned Stimson et al. patent.

The arrangements described so far cover the basic components of the exposure meter, which in combination with the calculator assembly 14 make up the complete device, and, as said above, these basic components are substantially identical to their corresponding counterparts in the aforesaid Stimson et al. patent.

Coming now to the calculator assembly 14, and referring particularly to Figures 1, 2 and 4, it is seen that it comprises a plurality of dials on which are arranged a plurality of concentric, radially spaced cooperating scales. The scales cover a wide range in exposure data, which, as will be seen from the following description, present their information in a way that allows for optimum ease and convenience in the use of the exposure meter.

Essentially, the calculator assembly comprises three rotatably mounted dials and a fourth dial that is fixed in relation to the three but rotatably mounted itself to allow for adjustments in meter sensitivity, the three dials moving as a unit, fixed in relation to each other, whenever the fourth dial is moved. The three dials are the inner dial 28, the intermediate dial 29 and the outer dial 30, all of which are rotatably mounted on the fourth dial 31, which in turn is rotatably mounted in the front cover of the exposure meter housing.

Figure 5:
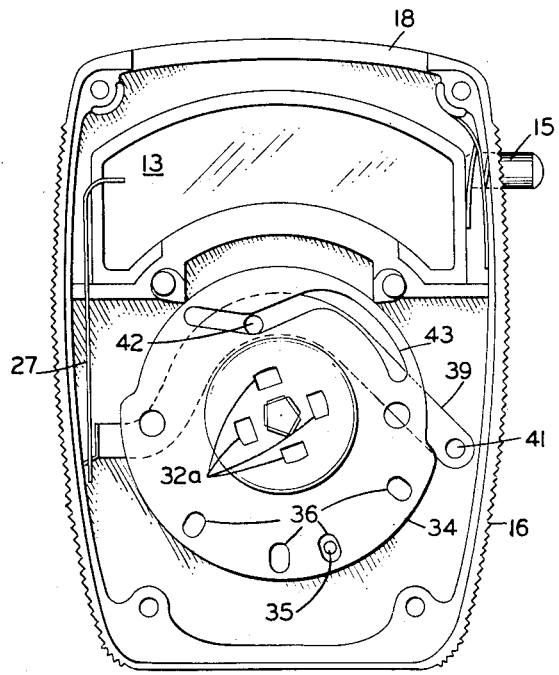
Figure 5 is a rear view of the front cover of the meter showing part of the structure utilized to change the sensitivity of the meter.

Figures 2, 5, and 6 best show the mounting arrangements for dial 31 and upon reference thereto, it is seen that the dial has a centrally disposed hub portion 32 which extends through aperture 33 provided in cover member 16, with the inner extremity of this hub formed into a plurality of locking projections 32a, each of which extend through cooperating apertures 34a formed in a resilient metallic cam plate 34. The dial 31 and its hub are formed as an integral member by molding a suitable transparent plastic material into the desired shape, with the locking projections 32a being formed over the peripheral edges of apertures 34a after assembly in the exposure meter. A captive ball 35 is mounted within cover 16 to selectively cooperate with a series of locking apertures 36, functioning as a detent to hold the dial 31 in any selected angular position while at the same time permitting adjustment of the angular position as desired. A spring washer 37 lies within a recess 38 formed around aperture 33 to take up any excess end play in the dial and cam plate assembly, thus assuring positive action for this portion of the device.

Lying between the front cover 16 and the cam plate 34 is crank 39, pivotally mounted at 41 on cover 16, having its opposite extremity connected to link 27, and a cam follower in the form of pin 42 captured within the cam slot 43 formed in cam plate 34. This arrangement allows the link 27 to be shifted up and down upon rotation of dial 31 to thereby control the position of shutter 26 as desired.

Figure 3:
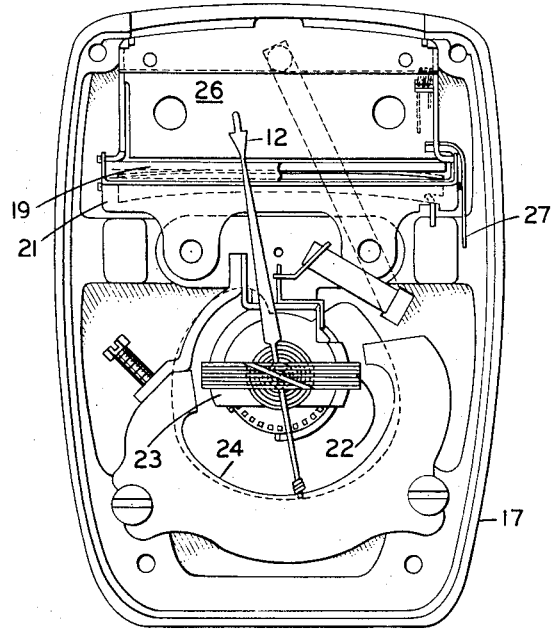
Figure 3 is a view similar to Figure 1, with the front cover removed, to show the internal arrangement of the light-responsive cell, the electro-responsive deflecting mechanism, and associated structure.

As is shown in Figures 3 and 5, when the pin 42 is in the valley of the cam slot 43, the link 27 is pulled down such that its upper extremity holds the shutter 26 down and off to one side of cell 19, thereby giving the cell maximum exposure. This setting would be used for dim light and corresponds to the "Lo" marking on the face of front cover 16. A knob 31a is formed as a part of dial 31 to facilitate the positioning thereof, and this knob also serves as an index which cooperates with the markings "Hi," "Lo," "R" and "I" to show at a glance the sensitivity setting of the meter.

When the pin 42 is driven to one of the three high positions of cam slot 43 (radially outward from the valley corresponding to "Lo" sensitivity), the link 27 is moved up such that its outer extremity moves out of the way of shutter 26, thereby allowing the shutter to pivot up and over cell 19 to reduce the amount of light falling upon the cell. As will be described in greater detail below, changing the position of shutter 26 changes the meter sensitivity by a factor of 16 or 4 f-stops. This action is similar to the action of the shutter described in the aforesaid Stimson et al. patent, but instead of moving a two-ended trident when the shutter position is changed, as is done in the patent, the scales of the calculator 14 are moved, since they are mounted on the dial 31 and move with it as a unit.

In normal use of the meter, the dial 31 will be moved only between the "Hi" and "Lo" positions, but if it is desired to further increase the sensitivity of the meter, a booster cell 44 may be attached thereto, such as that shown in Figure 7. In the arrangement shown, the dial 31 would be moved to the "R" position, in which the shutter is over the cell, where it remains in the event that dial 31 is moved to the "I" position which corresponds to use of the booster cell with its baffle 45 removed. The booster cell shown herein, together with its manner of attachment to and cooperation with the exposure meter, forms the basis of another patent application filed August 29, 1957, in the names of H. A. Bakke and A. G. Stimson, entitled "Booster Cell for Exposure Meter," Serial No. 681,058, and assigned along with this application to the same assignee. The purpose of showing the booster cell herein is merely to show how the calculator 14 can be accommodated for external sensitivity modifying means, as well as the internal means which form a part of the exposure meter.

Considering now the detailed arrangement of the calculator scales, the inner dial 28 is in the form of a dish-shaped member having an outer, sloping, flanged peripheral edge surrounding an annular recessed central area. The dial has a scale 28a covering a range of f-stop numbers—from 1 to 45—extending around about one-half of its peripheral edge, with another scale 28b covering a range in exposure values from 1 to 18—extending around the other half of its peripheral edge. Dial 28 is rotatably mounted on a bushing 46 which in turn is rotatably mounted on the hub 32 of dial 31, thereby allowing either scale to cooperate with pointer 12 to give a direct reading in either f-stops or exposure values.

It will be noted that both scales are linear, there being equal angular distances between each *f*-stop or exposure value number, and this follows from the logarithmic deflection characteristic of pointer 12. In the exposure meter shown, the pointer 12 moves through an angle of 10 degrees for each *f*-stop (except at the extreme lower limit of deflection), and the numerical indicia on both scales are correspondingly separated by an angle of 10 degrees.

Dial 28 also carries along outer portions of its recessed central area a pair of time scales 28c and 28d, concentric with the scales 28a and 28b and spaced radially inward therefrom. Scale 28c covers a range in shutter speeds for still cameras—from 1/1000 of a second to 120 seconds—where as scale 28d covers a range in frames per second for movie cameras—from 8 to 128. Scales 28c and 28d are correlated with the *f*-stop scale and to obtain correlation with the exposure value scale, there is a fiducial mark in the form of a triangle 28e arranged on the same radius as scales 28c and 28d and proximate to exposure value 12 on scale 28b.

Mounted within the recessed central area of dial 28 is the intermediate dial 29 which is staked to bushing 46 and frictionally coupled to dial 28 by means of spring washer 47. Dial 29 overlies scales 28c, 28d and fiducial mark 28e, but it has a pair of viewing portions through which these scales and mark may be seen, as desired. The viewing portions are in the form of cut-outs 48, 49, each of which has associated therewith a reference marker 51, 52, respectively. Cut-out 48 is marked "TIME-SEC." and cut-out 49 is marked "FR/SEC." to indicate respectively that the one cut-out is intended to be used with the shutter speed scale 28c and the other to be used with the frames-per-second scale 28d. The reference markers associated with each cut-out enable the scale to be set with precision when used.

The intermediate dial, in addition to having the viewing portions referred to above, carries a concentric scale 29a which is spaced radially inwardly from the time scales and covers a range in film speeds from ASA exposure index numbers .1 to 12000. Scale 29a has been devised to provide three exposure index numbers per *f*-stop and because of the short radius of this scale compared to the radii for the time scales and the *f*-stop scale, it has been necessary to devise an ingenious mechanism to increase the effective length of the scale within the restricted space available on dial 29. To this end an annular gear rack 53 has been formed in the face of dial 29 which engages a gear 54 rotatably mounted in dial 31 which in turn engages an annular gear rack 55 formed on the inner surface of outer dial 30.

As mentioned above, the dial 31 overlies dial 29, but since it is formed of a transparent plastic material, the two cut-outs 48 and 49 are clearly visible through the overlying portion. The dial 30 overlies scale 29a but it too has a viewing portion in the form of cut-out 56 through which a portion of scale 29a may be readily observed. Cut-out 56 has associated with it a reference marker 57 which allows for precise setting of exposure index number.

A portion of dial 31 has been removed from its front surface to form a centrally located conically shaped recess 58 into which is fitted the conically shaped center portion 59 formed in outer dial 30. The dial 30 is provided with the conical portion 59 to accommodate the enlarged head of rivet 61, the shank of which passes through apertures in both dials 30 and 31, the outer extremity of the shank ultimately passing through a central aperture in cam plate 34 to which it is riveted. Washers 62, 63, are provided to maintain necessary clearances between the assembled parts, it being understood that one or more washers can be used on each side of dial 30 as desired to take up manufacturing tolerances.

Also confined within the conical portion 59 and substantially filling the remainder of this portion not taken up by the enlarged head of rivet 61 is a push-button assembly which comprises an outer button 64 secured to a slotted spring member 65 by means of a rivet 66. The push-button assembly is press-fit into the recess provided in dial 30 in such a way that the peripheral edges of spring 65 firmly engage the side walls of the dial recess. A pair of ears 65a are turned inwardly from spring member 65 to engage the transverse slots 61a provided in the rivet head. This construction keys the button assembly to the rivet and assists in maintaining the push-button in place within the dial recess.

The push-button and spring form part of a locking assembly which normally locks the dial 30 against rotation. When the button is pushed inwardly, the lock is released in that the diameter of spring 65 is shortened to thereby draw the peripheral edges away from the surface it contacts within the dial recess. When the dial is disengaged from spring 65, it is free to rotate on rivet 61.

From the above, it is thus apparent that the dials 28, 29, and 30 can rotate relative to the dial 31 and to allow this rotation to occur with a minimum of binding, a plurality of captive balls 67 have been mounted in the dial 31.

Considering the action of the calculator and bearing in mind the aforesaid, it is apparent that with the dial 30 locked against rotation, the dial 29 will also be locked against rotation through the coupling of gear 54. This allows the dial 28 to slip relative to dial 29 as desired.

When the locking means holding dial 30 against rotation is released by pushing button 64, it is apparent that dial 29 is no longer restrained against rotation and through the frictional coupling with dial 28 will turn therewith upon rotation of dial 28. As the dial 29 rotates in one direction, it will cause the dial 30 to rotate in the opposite direction by means of the coupling provided by the two gear racks and the gear mounted in dial 31. This reverse rotation causes the reference marker 57 to move in one direction and the film speed scale 29a to move in the opposite direction. The net result of this action has the effect of doubling the film speed scale which is highly desirable in the calculator assembly, for it allows the scale 29a to cover a greatly expanded range in film speeds without increasing the space required to accommodate such a range.

When using the exposure meter, the exposure index number or film speed should be noted for the particular film being used, after which push-button 64 will be depressed to allow setting of the proper number in the calculator. The peripheral edges of inner dial 28 overlap the front cover for a slight distance on opposite edges thereof which allows the dial 28 to be easily rotated when setting the exposure meter, and rotation of this dial will enable the exposure index number to be quickly brought in registry with the cut-out 56. With the exposure index number set, the push-button is allowed to return to its normal position which has the effect of locking the exposure index setting. If still pictures are to be taken, the time scale 28c will be used and to select a desired time, the dial 28 will be rotated once again until the selected time appears in the viewing portion 48. This action will automatically position the *f*-stop scale 28a in proper position relative to pointer 12 so that upon depressing the pointer lock button 15, the pointer will move to a position along the *f*-stop scale corresponding to the light being measured. Once the pointer has come to rest, the pointer lock button will be released which will have the effect of locking the pointer in its assumed position, after which the *f*-stop setting will be directly read from the exposure meter.

If it is desired to use a particular *f*-stop setting, a slightly different use will produce the desired result in that the exposure index number will be set as aforesaid, but instead of setting the time scale, the selected *f*-stop will be brought into coincidence with the locked pointer and the time or shutter speed will then be observed through the viewing portion 48.

It is to be noted that the viewing portion 48 allows only a selected portion of the time scale to be read which materially enhances the readability of the meter. The cut-out in dial 30 also covers but a limited portion of the exposure index scale, thereby facilitating the use of the device. In one form of the invention the exposed peripheral edge of dial 29 may be given a finish which contrasts with the finish of dial 30 and the exposed edge of dial 28 to thereby facilitate the readability of the exposure meter. Additionally, the fractional portion of the time scale 28c may be given a color that contrasts with the whole second portion to further enhance readability of the device.

If it is desired to use the exposure meter in association with a movie camera, the exposure index will be set as aforesaid, but the frames-per-second viewing portion 49 will be used. If desired, the frames-per-second scale 28d may be given a finish which contrasts with the finish of either portion of scale 28c to further enhance the readability of the device and prevent possible errors in use.

In the event that exposure values are to be used rather than f-stop numbers, the exposure index will be set as aforesaid and the triangular fiducial mark 28e will be brought into the viewing portion 48 in registry with reference marker 51, this manipulation having the effect of positioning the exposure value scale 28b along the path of pointer 12.

As described above, the dial 31 may be moved through a plurality of positions in accordance with desired changes in sensitivity of the exposure meter, but no matter what angular position is selected, any relative setting of the dials 28, 29 and 30 will remain the same.

From the above, it is apparent that the exposure meter is simple to operate, covers a wide range in exposure data, is easily read, gives direct readings and is quite compact.

The exposure meter pointer has a logarithmic deflection characteristic for substantially its entire range of deflection, thus permitting the use of linear scales which may be directly and easily read, except at the extreme lower limit of deflection where the transfer lines 68a, 68b—which are formed in the opaque coating 68 applied to window 13—are relied upon to read the proper f-stop number or exposure value.

Figure 8:
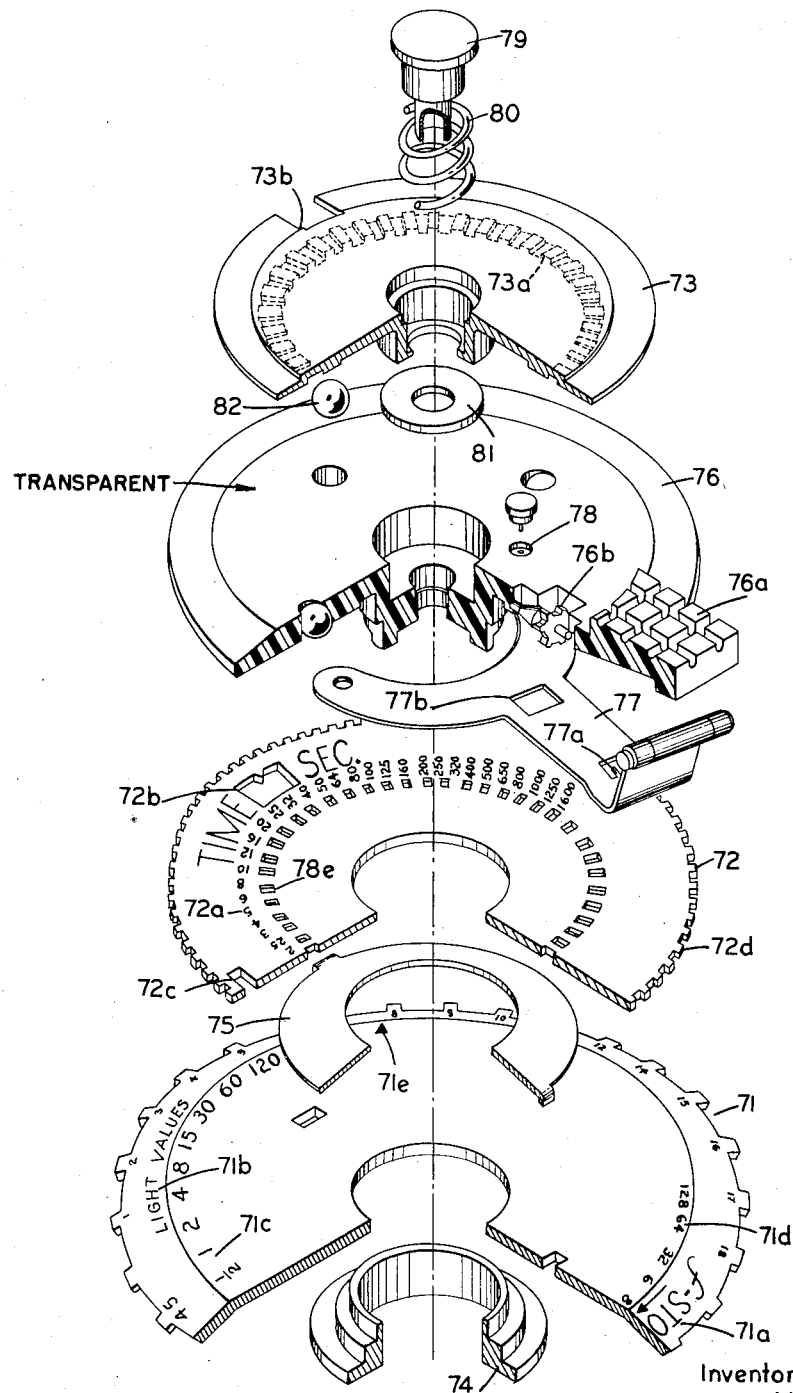

In Figure 8 there is shown a slightly modified form of the invention in which a different form of locking mechanism functions to lock the intermediate dial rather than the outer dial with all other aspects of the calculator being substantially the same as that shown in the preceding figures. Upon reference to Figure 8 it is seen that the calculator comprises inner, intermediate, and outer dials 71, 72, and 73, similar in most respects to the dials 28, 29 and 30, wherein the dial 71 has both an f-stop scale 71a and an exposure value or light value scale 71b along its peripheral edge. Concentric with these scales and spaced radially inward therefrom are the time scales 71c and 71d for still and movie cameras respectively, along with the fiducial mark 71e which cooperates with the light value scale, all in a manner described in connection with the embodiment of Figure 4. Dial 71 is rotatably mounted on bushing 74 which also carries thereon a dial 72, the latter dial being staked to the bushing. A spring washer 75, similar in operation to washer 47, frictionally couples dials 71 and 72 together and like dial 29, dial 72 has a concentric exposure index number or film speed scale 72a arranged at a radial distance which is shorter than the radial distance for the scales on dial 71. Suitable viewing apertures 72b and 72c are provided to cooperate with the scales 71c and 71d respectively, there being reference markers also associated with these viewing portions to allow for precision setting of the time scale. Bushing 74 is rotatably mounted on the stud of fixed transparent plastic dial 76 in a manner similar to the mounting arrangements of dials 28, 29 and 31, with the dial 76 being arranged in the exposure meter front cover in a manner similar to the mounting of dial 31. The range-shifting cam plate has not been shown, but it is to be understood that when the handle portion 76a of the plastic dial is manipulated, it can be rotated to accommodate the calculator for changes in sensitivity, with the calculator dials moving as a unit with the plastic dial during such manipulation.

Unlike the dial 29, dial 72 is provided with a serrated peripheral edge 72d which normally is engaged by the locking tooth 77a formed in the spring locking member 77. The spring locking member is rigidly secured to dial 76 by a pair of rivets, one of which is at 78 and a cut-out 77b is formed in the spring member 77 to provide clearance for the rotatably mounted gear 76b carried by dial 76. As in the case of dials 29 and 30, the dials 72 and 73 have annular juxtaposed racks 72e and 73a respectively, these racks being engaged by gear 76b to couple the dials together for the purposes intended.

Dial 73 has a hub portion which extends into a central recess formed in dial 76, both of which have a centrally located aperture to accommodate the shank of rivet 79 provided to hold the dial 73 in place on the calculator assembly. The spring 80 and washer 81 take up any looseness in the fitting of these parts and the spring also serves to maintain enough pressure on dial 73 to insure good coupling between the gear and cooperating racks. A plurality of captive balls 82 carried by dial 76 allows for rotation of dials 72 and 73 relative to dial 76 without objectionable binding.

In operation of this form of calculator, the outer end of spring member 77 is pulled toward the dial 76 to disengage tooth 77a from the serrated edge of dial 72. This unlocks dial 72 and allows it to rotate through the friction coupling of washer 75 whenever the dial 71 is adjusted. As the dial 72 rotates with dial 71, it causes the outer dial 73 to rotate in the opposite direction, whereby the viewing aperture 73b provided in the outer dial can be brought into registry with the proper exposure index number. Once this information has been set into the calculator, the spring member 77 is released and because of its normal biasing characteristic, it will drop down and allow the locking tooth 77a to engage dial 72. When this occurs, further manipulation of dial 71 will cause the appropriate number on the selected time scale to come into view through the viewing apertures provided in dial 72. With the selected time thus set, the f-stop scale is automatically positioned relative to the pointer for direct reading of the device.

Thus, it is seen that functionally the embodiment of Figure 8 is similar to the embodiment of Figure 4 but differs therefrom in the specific locking mechanism used and differs further in that the intermediate dial is normally locked instead of the outer dial.

One further feature of both forms of the calculator assembly is the ability of the exposure meter to also indicate in terms of Polaroid Land Camera shutter-numbers. For this application the 30-second marking on either of the time scales 28c or 71c is brought into registry with the reference marker associated with the viewing portions 48, 72b respectively. Because of the high exposure index number of the Polaroid Land Film (200 and above), this setting has the effect of bringing the lower portion of the exposure value scale proximate to the pointer, with the proper number being directly read from the meter.

Therefore, while particular embodiments of the subject invention have been shown and described herein, these are in the nature of description rather than limitation, and it will occur to those skilled in the art that various changes, modifications, and combinations may be made within the province of the appended claims, and without departing either in spirit or scope from this invention in its broader aspects.

What we claim as new and desire to scure by Letters Patent of the United States is:

1. For use in an exposure meter of the type utilizing a light responsive cell and an electro-responsive deflecting mechanism connected to the cell and including a pivotally mounted pointer actuated by said mechanism: the pointer moving in response to light falling upon the cell, and a calculator dial assembly cooperating with said pointer to give a direct indication of exposure settings; said dial assembly including a plurality of concentrically arranged dials which in turn include a plurality of concentrically arranged scales, there being a first scale including a range in $f$-stop numbers, a second scale including a range in camera shutter speeds, and a third scale covering a range in film speeds; said first scale being arranged proximate to said pointer and cooperating therewith to give a direct indication of $f$-stop settings; said dials being rotatably mounted and angularly adjustable relative to each other to correlate the exposure information covered by said three scales, means for preventing relative movement of the dials following angular adjustment thereof, and a common support member on which all of said dials are rotatably mounted, said support member being rotatably mounted and movable to a plurality of angular positions corresponding to differences in meter sensitivity, said calculator dial assembly moving as a unit relative to said pointer when said support member moves whereby the calculator is adjusted to compensate for variations in meter sensitivity without changing the correlated positions of any of said scales relative to each other, so the exposure information correlating to a given $f$-stop setting will be directly indicated without readjustment of the dials when the calculator is moved from one of its angular positions to another of said positions.

2. For use in an exposure meter of the type utilizing a light responsive cell and an electro-responsive deflecting mechanism connected to the cell and including a pivotally mounted pointer actuated by said mechanism: the pointer moving in response to light falling upon the cell, and a calculator assembly cooperating with said pointer to give a direct indication of exposure settings; said calculator assembly including first, second, and third concentrically arranged rotatably movable scales, said second scale having a diameter less than the diameter of said first scale and greater than the diameter of said third scale, said first scale including a range in $f$-stop numbers and being arranged proximate to said pointer to cooperate therewith to give a direct indication of $f$-stop settings; said second scale including a range in camera shutter speeds; said third scale covering a range in film speeds; means forming a part of said calculator assembly to set the angular position of said third scale in accordance with a desired film speed and to set the angular position of said second scale in accordance with a desired shutter speed; said first and second scale moving together with said third scale when said third scale is set and said first and second scales moving together relative to said third scale when said second scale is set; and means for rotating said calculator assembly as a unit to different angular positions corresponding to differences in meter sensitivity, said scales remaining in the relative position in which they have been set whenever said calculator assembly is rotated, so the exposure information correlating to a given $f$-stop setting will be directly indicated without the adjustment of the dials when the calculator is moved from one of its angular positions to another of said positions.

3. For use in an exposure meter of the type utilizing a light responsive cell and an electro-responsive deflecting mechanism connected to the cell and including a pivotally mounted pointer actuated by said mechanism: the pointer moving in response to light falling upon the cell, and a calculator assembly cooperating with said pointer to give a direct indication of exposure settings; said calculator assembly including first, second, and third concentrically arranged rotatably movable scales, said second scale having a diameter less than the diameter of said first scale and greater than the diameter of said third scale, said first scale including a range in $f$-stop numbers and being arranged proximate to said pointer to cooperate therewith to give a direct indication of $f$-stop settings; said sceond scale including a range in camera shutter speeds; said third scale covering a range in film speeds; and means forming a part of said calculator assembly to set the angular position of said third scale in accordance with a desired film speed and to set the angular position of said second scale in accordance with a desired shutter speed; said first and second scales moving together with said third scale when said third scale is being set and said first and second scales moving together relative to said third scale when said second scale is being set; said means including a rotatably mounted reference marker which cooperates with said third scale to indicate its angular position; said reference marker moving relative to said third scale only when said third scale is being set and then only in a direction opposite to the direction of rotation of said third scale.

4. For use in an exposure meter of the type utilizing a light responsive cell and an electro-responsive deflecting mechanism connected to the cell and including a pivotally mounted pointer actuated by said mechanism: the pointer moving in response to light falling upon the cell, and a calculator assembly cooperating with said pointer to give a direct indication of exposure settings; said calculator assembly including first, second, and third concentrically arranged rotatably movable scales, said second scale having a diameter less than the diameter of said first scale and greater than the diameter of said third scale, said first scale including a range in $f$-stop numbers and being arranged proximate to said pointer to cooperate therewith to give a direct indication of $f$-stop settings; said second scale including a range in camera shutter speeds; said third scale covering a range in film speeds; a first reference marker fixed in relation to said third scale and cooperating with said second scale to indicate the setting of said second scale; a second reference marker movable relative to said third scale and coperating therewith to indicate its setting; means for mechanically coupling the second reference marker and the third scale so said second reference marker and said third scale move in opposite directions when said third scale is set; and means forming a part of said calculator assembly to set the angular position of said third scale in accordance with a desired film speed and to set the angular position of said second scale in accordance with a desired shutter speed; said first and second scales moving together with said third scale when said third scale is being set so the exposure information on the first and third scales is properly correlated, and said first and second scales moving together relative to said third scale when said second scale is being set whereby $f$-stop settings may be directly indicated by the pointer for any given film speed set on said third scale.

5. For use in an exposure meter of the type utilizing a light responsive cell and an electro-responsive deflecting mechanism connected to the cell and including a pivotally mounted pointer actuated by said mechanism: the pointer moving in response to light falling upon said cell, and a calculator dial assembly cooperating with said pointer to give a direct indication of exposure settings; said dial assembly including outer, intermediate, and inner concentrically arranged, rotatably mounted dials; said intermediate dial having a diameter less than the diameter of said inner dial and greater than the diameter of said outer dial; said inner dial having a portion of its peripheral edge extending along the path traversed by said pointer with a first scale including a range in $f$-stop numbers arranged along said peripheral edge to cooperate with said pointer and a second scale including a range in camera shutter speeds arranged concentrically with said first scale and spaced radially inward therefrom; said intermediate dial overlying said shutter speed scale and having a first viewing portion through which a limited section of said shutter speed scale may be observed; said intermediate dial having a third scale covering a range in film speeds arranged concentrically with said second scale and spaced radially inward therefrom; said outer dial overlying said film speed scale and having a second viewing portion through which a limited section of said film speed scale may be observed; releasable means normally locking said intermediate and said outer dials against relative rotation to permit independent setting of the angular position of said inner dial; means for releasing said last-named means and locking said intermediate and said inner dials against relative motion; and means coupling said intermediate and said outer dials and operable when said outer dial is free to rotate to cause said outer dial to rotate in one direction in response to rotation of said inner dial and said intermediate dial in an opposite direction so the exposure information on the first and third scales is properly correlated by said coupling means when the outer dial is moved to set a given film speed on the third scale.

6. For use in an exposure meter of the type utilizing a light responsive cell and an electro-responsive deflecting mechanism connected to the cell and including a pivotally mounted pointer actuated by said mechanism: the pointer moving in response to light falling upon said cell, and a calculator dial assembly cooperating with said pointer to give a direct indication of exposure settings; said dial assembly including outer, intermediate, and inner concentrically arranged, rotatably mounted dials; said intermediate dial having a diameter less than the diameter of said inner dial and greater than the diameter of said outer dial; said inner dial having a portion of its peripheral edge extending along the path traversed by said pointer with a first scale including a range in f-stop numbers arranged along said peripheral edge to cooperate with said pointer and a second scale including a range in camera shutter speeds arranged concentrically with said first scale and spaced radially inward therefrom; said intermediate dial overlying said shutter speed scale and having a first viewing portion through which a limited section of said shutter speed scale may be observed; said intermediate dial having a third scale covering a range in film speeds arranged concentrically with said second scale and spaced radially inward therefrom; said outer dial overlying said film speed scale and having a second viewing portion through which a limited section of said film speed scale may be observed; releasable means normally locking said intermediate and said outer dials against relative rotation to permit independent setting of the angular position of said inner dial; means for releasing said last-named means and locking said intermediate and said inner dials against relative motion; and means coupling said intermediate and said outer dials and operable when said outer dial is free to rotate to cause said outer dial to rotate in one direction in response to rotation of said intermediate dial in an opposite direction, and means for rotating said calculator assembly as a unit to different angular positions corresponding to differences in meter sensitivity, said scales remaining in the relative position in which they have been set whenever said calculator assembly is rotated so the exposure information correlating to a given f-stop setting will be directly indicated without readjustment of the dials when the calculator is moved from one of its angular positions to another of said positions.

7. For use in an exposure meter of the type utilizing a light responsive cell and an electro-responsive deflecting mechanism connected to the cell and including a pivotally mounted pointer actuated by said mechanism; the pointer moving in response to light falling upon said cell, and a calculator dial assembly cooperating with said pointer to give a direct indication of exposure settings; said dial assembly including outer, intermediate, and inner concentrically arranged, rotatably mounted dials; said intermediate dial having a diameter less than the diameter of said inner dial and greater than the diameter of said outer dial; said inner dial having a portion of its peripheral edge extending along the path traversed by said pointer with a first scale including a range in f-stop numbers arranged along said peripheral edge to cooperate with said pointer and a second scale including a range in camera shutter speeds arranged concentrically with said first scale and spaced radially inward therefrom; said intermediate dial overlying said shutter speed scale and having a first viewing portion through which a limited section of said shutter speed scale may be observed; said intermediate dial having a third scale covering a range in film speeds arranged concentrically with said second scale and spaced radially inward therefrom; said outer dial overlying said film speed scale and having a second viewing portion through which a limited section of said film speed scale may be observed; releasable means normally locking said intermediate and said outer dials against relative rotation to permit independent setting of the angular position of said inner dial; means for releasing said last-named means and locking said intermediate and said inner dials against relative motion; and means coupling said intermediate and said outer dials and operable when said outer dial is free to rotate to cause said outer dial to rotate in one direction in response to rotation of said intermediate dial in an opposite direction, and means for rotating said calculator assembly as a unit to different angular positions corresponding to differences in meter sensitivity, said scales remaining in the relative position in which they have been set whenever said calculator assembly is rotated, said last-named means including a rotatably mounted transparent dial portion and means for locking the inner, intermediate, and outer dials to said transparent dial portion, said transparent dial portion lying between said intermediate and said outer dials and having a knob formed adjacent a portion of its peripheral edge to facilitate rotation thereof.

8. The combination defined by claim 7 wherein the means coupling said intermediate and said outer dials comprise a first annular gear rack formed concentrically in said intermediate dial and spaced radially inward from said third scale, a second annular gear rack formed concentrically in said outer dial and arranged in juxtaposition to said first gear rack, and a gear rotatably mounted in said transparent dial portion having portions which engage both of said gear racks.

9. For use in an exposure meter of the type utilizing a light responsive cell and an electro-responsive deflecting mechanism connected to the cell and including a pivotally mounted pointer actuated by said mechanism: the pointer moving in response to light falling upon the cell, and a calculator dial assembly cooperating with said pointer to give a direct indication of exposure settings; said dial assembly including outer, intermediate, and inner concentrically arranged, rotatably mounted annular dials; said intermediate dial having a diameter less than the diameter of said inner dial and greater than the diameter of said outer dial; said inner dial having a portion of its peripheral edge extending along the path traversed by said pointer with a first scale arranged along said peripheral edge to cooperate with said pointer; said first scale including a range in f-stop numbers arranged along one-half of said peripheral edge and a range in exposure value numbers arranged along the other half of said peripheral edge; said first dial having a second scale arranged concentrically with said first scale and spaced radially inward therefrom; said second scale including a range in camera shutter speeds extending part way around said dial and a fiducial mark, said range in shutter speeds being correlated to said range in f-stop numbers and said fiducial mark being correlated to said exposure value numbers; said intermediate dial having a third scale arranged concentrically with said second scale and spaced radially inward therefrom; said third scale being substantially annular and covering a range in film speeds; a first reference marker carried by said intermediate dial and cooperating with said second scale to indicate the setting thereof; a second reference marker formed on said outer dial and cooperating with said third scale to indicate the setting thereof; and means forming a part of said calculator dial assembly operable in one position to allow said inner and said intermediate dials to rotate as a unit in one direction while said outer dial is rotating in the opposite direction to thereby set the position of said third scale to a given value while automatically correlating the exposure information on the first and third scales, said means being operable in another position to allow said inner dial to rotate relative to said intermediate and said outer dials to thereby set the position of said second scale without changing the setting of the third scale.

10. For use in an exposure meter of the type utilizing a light responsive cell and an electro-responsive deflecting mechanism connected to the cell and a pivotally mounted pointer forming a part of said deflecting mechanism; the pointer moving in response to light falling upon said cell, and an improved calculator assembly cooperating with said pointer to give an indication of exposure information, said calculator assembly including a rotatably mounted arcuate scale covering a range in exposure data, means frictionally coupled to said scale for setting its angular position in accordance with exposure data selected from within said range, a rotatably mounted reference marker cooperating with said scale to indicate said selected exposure data, means coupling said scale and said marker operable to cause either to rotate in response to motion of the other, said coupling means being effective to cause said scale and said marker always to move in opposite directions, spring means for locking said scale and said marker against rotation to hold said selected exposure data, and means for releasing said spring means to permit selection of other values of exposure data within said range.

11. The combination defined by claim 10 wherein said spring means engages said marker to lock it against rotation and a push-button is provided to release said spring means.

12. The combination defined by claim 10 wherein said scale includes a serrated peripheral portion and said spring means includes a locking tooth which normally engages said serrated portion to lock said scale against rotation, and a resilient arm is provided to disengage said tooth from said serrated portion.

References Cited in the file of this patent

UNITED STATES PATENTS

| | | |
|---|---|---|
| 725,807 | Watkins | Apr. 21, 1903 |
| 2,418,370 | Simmon | Apr. 1, 1947 |
| 2,529,337 | Hickok | Nov. 7, 1950 |
| 2,532,417 | Norman | Dec. 5, 1950 |
| 2,584,440 | Fogle | Feb. 5, 1952 |
| 2,707,592 | Rice | May 3, 1955 |
| 2,735,618 | Venable | Feb. 21, 1956 |

FOREIGN PATENTS

| | | |
|---|---|---|
| 487,065 | Great Britain | June 15, 1938 |